(No Model.)

F. S. OSBORNE.
PHOTOGRAPHIC NEGATIVE FILM HOLDER.

No. 426,054.            Patented Apr. 22, 1890.

Witnesses.
Wm. M. Rheem.
Flora L. Brown.

Inventor.
Frank Sayre Osborne,
By Charles J. Brown.
Atty.

THE NORRIS PETERS CO., PHOTO-LITHO., WASHINGTON, D. C.

UNITED STATES PATENT OFFICE.

FRANK SAYRE OSBORNE, OF CHICAGO, ILLINOIS.

PHOTOGRAPHIC-NEGATIVE-FILM HOLDER.

SPECIFICATION forming part of Letters Patent No. 426,054, dated April 22, 1890.

Application filed October 3, 1889. Serial No. 325,874. (No model.)

*To all whom it may concern:*

Be it known that I, FRANK SAYRE OSBORNE, a citizen of the United States, residing at Chicago, in the county of Cook and State of Illinois, have invented certain new and useful Improvements in Photographic-Negative-Film Holders to hold "photographic negative films," as they are termed, of which the following is a full and complete specification.

My invention relates to the art of making photographic negatives by the dry-plate process; and it consists of a device applicable to photographic cameras with which photographic negatives are obtained upon a continuous roll of properly-prepared transparent film, such roll of photographic negative film being placed in the camera wound upon a roll and adapted to be unwound therefrom, drawn in front of the photographic lens upon a plane surface, there exposed, when desired, to the action of light entering the camera through the lens, and then rewound upon a second roll, also placed within the camera-box.

In making exposures of the film in the manner set out it is at times desirable to remove from the second roll the exposed portion of the film as often as a single exposure has been made, thus securing a single negative, as in the operation of an ordinary camera, where a glass plate properly prepared is used for obtaining a negative, and the waste of such negative film heretofore attendant upon the use of the holders now in use to engage with the end of the roll adjacent to the roller upon which the film is wound after exposure has materially increased the expense of such single negatives; and the object of my invention is to obtain a holder by which a photographic negative film may be held at one end and near the edge thereof with sufficient firmness to hold the part or portion of the film intended to be exposed, in the ordinary manner of exposing photographic negatives, in position for such exposure and in a way to avoid all, or nearly all, of the waste referred to.

Figure 1:
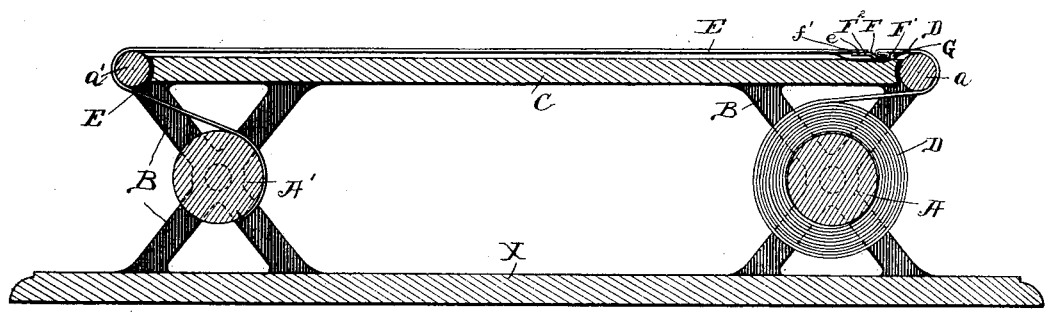
Figure 2:
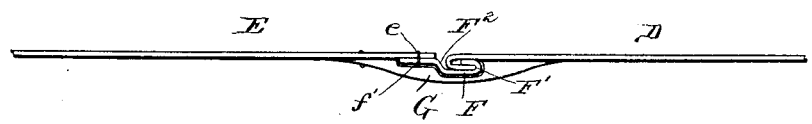
Figure 3:
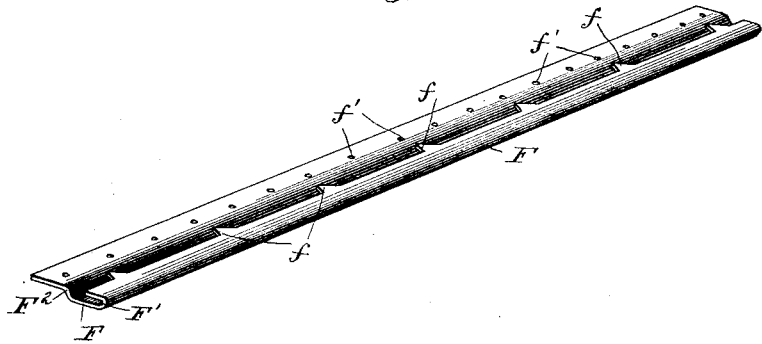

I have illustrated my invention by the drawings accompanying and forming a part of this specification, in which Figure 1 is a cross-section of the roller upon which the photographic negative film is mounted when inserted in the camera, of the table in front of which that portion of such film intended to be exposed to the action of rays of light passing through the lens of the camera is placed, and of the roller upon which such film may be wound after such exposure, with the necessary supporting parts. Fig. 2 is an elevation of my device attached to a strip of cloth, leather, or elastic rubber webbing, which forms a part of the device, and having secured therein one end of a photographic negative film. Fig. 3 is a perspective view of the piece of metal constituting the principal feature of my invention.

Like letters refer to like parts throughout the several views.

X is the base, upon which I have mounted the several movable parts of the mechanism pertaining to the camera with which my device is designed to operate.

A is a roller, upon which there is wound, previous to placing it in position in its supports, photographic negative film.

A' is a roller adapted to have wound thereon such photographic negative film.

$a\ a'$ are rollers, usually termed "idlers," over which the photographic negative film travels when unwound from roller A and wound upon roller A'.

B B are the supports upon which the several rollers A A' and $a\ a'$ are revolubly mounted.

C is a table or plane surface, also mounted upon supports B B. The film is drawn over this plane surface C, resting thereon or closely adjacent thereto when exposed for the purpose of obtaining a photographic negative.

D is the photographic negative film.

E is a piece of textile fabric or flexible material, as leather, attached at one end to roller A' and at the other end to sheet-metal holder F. Textile fabric E is of sufficient length to reach from the roller A' around roller $a'$, over table C, and to or nearly to roller $a$.

Sheet-metal holder F is well illustrated in Fig. 3; and it consists of a strip of sheet metal having bend F' therein, teeth $f$ thereon, and the holes $f'$ or other means whereby it may be secured to the textile fabric E.

In using my invention with photographic negative film of sufficient thickness it will be found that the teeth $f$ may be dispensed with entirely. As, however, the device is intended to be used with such photographic negative film as is handled commercially and which is liable to vary in thickness, and hence may have placed therein at different times photographic negative film of different thickness, I do not deem it advisable ever to construct my device without teeth $f$ in the sheet-metal strip F, although such teeth need not be of the length or number illustrated in the drawings.

$F^2$ is a bend in the strip of sheet metal forming the holder which I have found very desirable to make, but which I do not consider indispensable.

G is a piece of leather, having its edges skived to a thin film and having a portion cut away to admit the embedding therein of the sheet-metal holder F. The object and purpose of this piece of leather G, which is placed on the back of the holder, is that the metal holder will be covered thereby when the holder is wound upon the roller A', and a smooth surface will thus be presented to the photographic negative film, which is superimposed thereon in winding it upon the roller.

In the operation of my device a photographic negative film is inserted between the surfaces formed in the sheet-metal holder F by bend F', and then folded forward over the teeth $f$ in substantially the manner illustrated in Figs. 1 and 2. Flexible material E is then wound around roller A', and thereby sufficient strain obtained on the holder F to cause teeth $f$ to penetrate the film D enough to securely hold it in front of plane surface C, when desired, and to draw it around such roller A'.

Having thus described my invention and its operation, what I claim, and desire to secure by Letters Patent, is—

1. In a photographic-negative-film holder, the combination of a sheet-metal strip having a bend therein by which the strip is folded over upon itself with sufficient width between the surfaces adjacent to permit the insertion of photographic negative film, elastic flexible material secured to the other edge of the metal strip, and leather attached to the back of the metal strips, the edges of such leather being skived and the sheet-metal strip being embedded in the main part thereof, substantially as described.

2. In a photographic-negative-film holder, the combination of sheet-metal piece F, having therein bend F' and holes $f'$, with flexible material E and rollers A A', substantially as described.

3. In a photographic-negative-film holder, the combination of sheet-metal piece F, having therein bend F', teeth $f$, and holes $f'$, with flexible material E and rollers A A', substantially as described.

4. In a photographic-negative-film holder, the combination of a sheet-metal strip having a bend therein by which the strip is folded over upon itself with sufficient width between the surfaces adjacent to permit the insertion of photographic negative film, teeth on one edge of such metal strip adapted to penetrate the film, flexible material secured to the other edge of the metal strip, and leather secured to the back of the metal strip, the edges of such leather being skived and the sheet-metal strip being embedded in the main part thereof, substantially as described.

FRANK SAYRE OSBORNE.

Witnesses:
TREAT. T. PROSSER,
CHARLES T. BROWN.